United States Patent
Hashimoto et al.

(10) Patent No.: US 8,032,728 B2
(45) Date of Patent: Oct. 4, 2011

(54) DIGITAL DATA REPRODUCING APPARATUS AND RECORDING MEDIUM

(75) Inventors: Akira Hashimoto, Oizumi-machi (JP); Masatoshi Sato, Ota (JP)

(73) Assignees: Sanyo Semiconductor Co., Ltd., Gunma (JP); Semiconductor Components Industries, LLC, Phoenix, AZ (US)

( * ) Notice: Subject to any disclaimer, the term of this patent is extended or adjusted under 35 U.S.C. 154(b) by 322 days.

(21) Appl. No.: 12/402,394

(22) Filed: Mar. 11, 2009

(65) Prior Publication Data

US 2009/0254727 A1    Oct. 8, 2009

(30) Foreign Application Priority Data

Mar. 13, 2008  (JP) ................................. 2008-064673

(51) Int. Cl.
 *G06F 12/00* (2006.01)
(52) U.S. Cl. ................................. 711/165; 711/E12.069
(58) Field of Classification Search .................... 711/156
 See application file for complete search history.

(56) References Cited

U.S. PATENT DOCUMENTS 7,003,791 B2 * 2/2006 Mizutani ........................ 725/21
7,203,795 B2 * 4/2007 Urazoe ........................ 711/113

FOREIGN PATENT DOCUMENTS

JP    2007-133955    5/2007

* cited by examiner

*Primary Examiner* — Kevin Ellis
*Assistant Examiner* — Hamdy Ahmed
(74) *Attorney, Agent, or Firm* — SoCal IP Law Group LLP; Steven C. Sereboff; John E. Gunther

(57) ABSTRACT

A digital data reproducing apparatus comprising: a reading unit configured to read digital data stored in a recording medium at a speed higher than a reproduction speed to store the digital data into a first memory; an encoding unit configured to store encoded data obtained by encoding the digital data read by the reading unit into a second memory; a reproducing unit configured to reproduce the digital data stored in the first memory at the reproduction speed; and a transferring unit configured to transfer the encoded data stored in the second memory into a third memory different from the second memory.

5 Claims, 3 Drawing Sheets

DIGITAL DATA REPRODUCING APPARATUS AND RECORDING MEDIUM

CROSS-REFERENCE TO RELATED APPLICATION

This application claims the benefit of priority to Japanese Patent Application No. 2008-64673, filed Mar. 13, 2008, of which full contents are incorporated herein by reference.

BACKGROUND OF THE INVENTION

1. Field of the Invention

The present invention relates to a digital data reproducing apparatus and a recording medium.

2. Description of the Related Art

Audio and video digital data stored in a recording medium such as CD (Compact Disc) are converted into the MP3 (MPEG Audio Layer-3) format and transferred to an external memory such as a portable player through USB (universal Serial Bus), etc., in some cases. Such encoding of digital data for transfer to the external memory such as compression is called ripping. A reproducing apparatus such as an audio device or a personal computer may perform the ripping to transfer the data generated by the ripping to an external memory while reading digital data at the same speed as the reproduction speed and reproducing the read digital data to output audio or video (see, e.g., Japanese Patent Application Laid-Open Publication No. 2007-133955). When such a reproducing apparatus is used, ripped data may be transferred to an external memory while enjoying audio and video.

The data generated by the ripping is temporarily stored in a work memory inside or outside the reproducing apparatus. The data stored in the work memory are read and transferred to the external memory through USB, etc. When the transfer speed to the external memory is lower than the ripping speed or when the transfer to the external memory is temporarily interrupted, the ripped data are accumulated in the work memory and the remaining capacity of the work memory is reduced. In such a case, the readout of digital data from a recording medium such as CD must temporarily be stopped to prevent the work memory from overflowing. If the readout of digital data is temporarily stopped in the case of ripping during reproduction, the reproduction of audio or video is discontinued while the read out is stopped since the digital data are read at the same speed as the reproduction speed.

SUMMARY OF THE INVENTION

A digital data reproducing apparatus according to an aspect of the present invention, comprises: a reading unit configured to read digital data stored in a recording medium at a speed higher than a reproduction speed to store the digital data into a first memory; an encoding unit configured to store encoded data obtained by encoding the digital data read by the reading unit into a second memory; a reproducing unit configured to reproduce the digital data stored in the first memory at the reproduction speed; and a transferring unit configured to transfer the encoded data stored in the second memory into a third memory different from the second memory.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
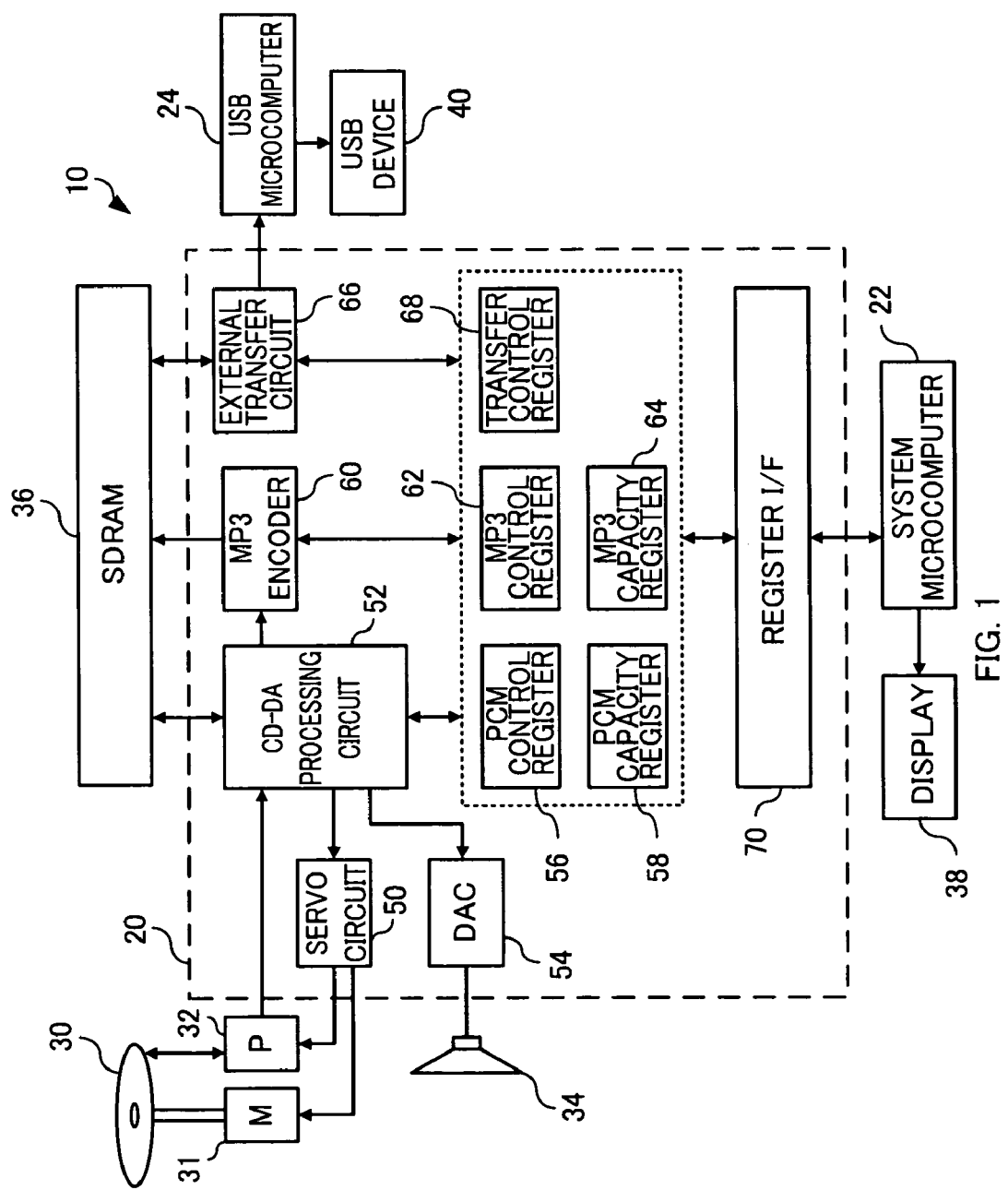
FIG. 1 is a diagram of a configuration of a digital data reproducing apparatus that is one embodiment of the present invention.

FIG. 1 is a diagram of a configuration of a digital data reproducing apparatus that is one embodiment of the present invention. A digital data reproducing apparatus 10 includes a DSP (Digital Signal Processor) 20, a system microcomputer 22, and a USB (Universal Serial Bus) microcomputer 24.

Figure 2:
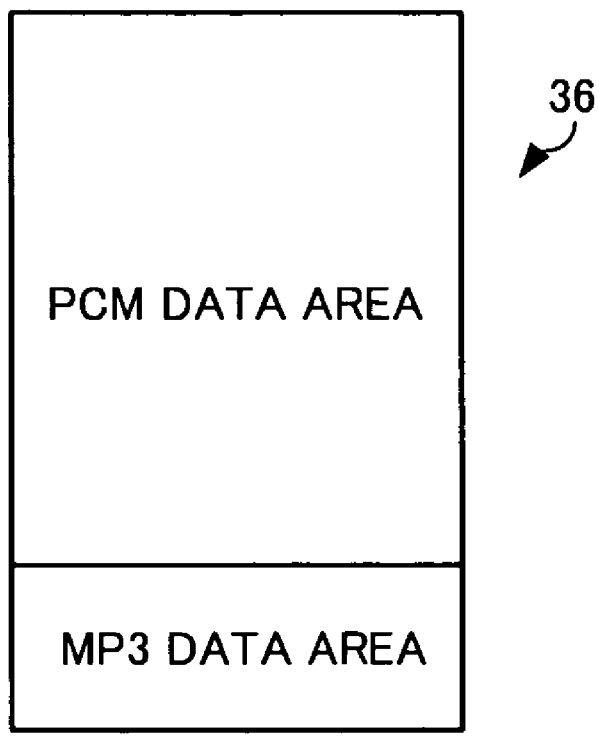
FIG. 2 is a diagram of an example of PCM data area and MP3 data area formed on SDRAM.

The DSP 20 rotates a CD-standard recording medium 30 with a spindle motor 31, reads digital data (PCM data) in the PCM (pulse Code Modulation) format with a laser beam output from a pickup 32, and reproduces the read PCM data to output audio from a speaker 34 based on the control of the system microcomputer 22. The DSP 20 generates encoded data (MP3 data) obtained by encoding the PCM data read to be reproduced from the recording medium 30 into the MP3 format and outputs the encoded data to the USB microcomputer 24 based on the control of the system microcomputer 22. The format conversion for transferring digital data stored in a recording medium or input from a tuner, etc., to an external memory such as a portable player is called ripping. A process of generating MP3 data from PCM data stored in the recording medium 30 is the ripping in this embodiment. As shown in FIG. 2, SDRAM (Synchronous Dynamic Random Access Memory) 36 is provided with a PCM data area (first memory) that stores PCM data and an MP3 data area (second memory) that stores MP3 data, and the DSP 20 stores the PCM data read from the recording medium 30 and the MP3 data generated by the ripping into the SDRAM 36.

The system microcomputer 22 (control unit) accepts instructions for reproducing the PCM data, executing the ripping, etc., from a user to transmit data to and receive data from the DSP 20 depending on the instructions. The system microcomputer 22 may output various pieces of information associated with the reproduction of the PCM data, the ripping, etc., to a display 38. For example, when a certain tune is reproduced, reproduction instruction data specifying the track number of the tune are transmitted to the DSP 20. Control data about reproduction time, etc., are transmitted from the DSP 20 to the system microcomputer 22, and information obtained from the control data is displayed on the display 38. Alternatively, for example, when a certain tune is ripped during reproduction, the ripping instruction data are transmitted to the DAP 20 along with the reproduction instruction data specifying the track number of the tune.

The USB microcomputer 24 is a processing circuit for transferring the data output from the DSP 20 to a USB device 40 such as a portable music player having a memory (third memory) connected through a USB connector. For example, the MP3 data generated by the ripping are sequentially output to the USB microcomputer 24 at a speed in accordance with the specifications of the USB microcomputer 24 and the USB device 40 and are transferred to the USB device 40.

Although the recording medium 30 conforms to the CD standard in this embodiment, the standard of the recording medium 30 is not limited to CD and may be any standards, for example, DVD (Digital Versatile Disc), as long as the stored digital data may be ripped. The digital data to be ripped are not limited to PCM data and the data generated by the ripping are not limited to MP3 data. For example, digital data in the DVD-Video format may be ripped to generate digital data in the MPEG format. The standard for transferring the digital data generated by the ripping to an external portable music player, etc., is not limited to USB.

A detailed configuration of the DSP 20 will be described. The DSP 20 includes a servo circuit 50, a CD-DA (Compact Disc Digital Audio) processing circuit 52, a DAC (Digital to Analog Converter) 54, a PCM control register 56, a PCM capacity register 58, an MP3 encoder 60, an MP3 control register 62, an MP3 capacity register 64, an external transfer circuit 66, a transfer control register 68, and a register I/F (Interface) 70.

The servo circuit 50 controls the spindle motor 31 to adjust the readout speed of the PCM data stored in the recording medium 30. The servo circuit 50 controls the pickup 32 such that the laser beam output from the pickup 32 is applied to a proper position. The servo circuit 50 controls the rotation speed of the spindle motor 31 to read the PCM data stored in the recording medium 30 at a speed higher than the reproduction speed (the bit rate of the PCM data). The PCM data are assumed to be read at double speed of the reproduction speed in this embodiment.

The CD-DA processing circuit 52 (reading unit) outputs control data for reading desired PCM data stored in the recording medium 30 to the servo circuit 50 based on the information set in the PCM control register 56. The CD-DA processing circuit 52 converts RF (Radio Frequency) signals output from the pickup 32 into digital signals to generate PCM data and store the generated PCM data into the PCM data area of the SDRAM 36. The PCM data read at double speed are stored in the PCM data area of the SDRAM 36. The CD-DA processing circuit 52 stores the PCM data into the PCM data area of the SDRAM 36 in a cyclic manner. The PCM data area acts as a ring buffer. The PCM data generated by the CD-DA processing circuit 52 are also output to the MP3 encoder 60. The CD-DA processing circuit 52 updates the information stored in the PCM capacity register 58 and indicative of the remaining capacity of the PCM data area as needed. The information indicative of the remaining capacity of the PCM data area is, for example, a size of the remaining capacity of the PCM data area, a usage rate of the PCM data area, a write address of the PCM data, etc. The CD-DA processing circuit 52 outputs to the servo circuit 50 control data for performing the focus control and the tracking control of the pickup 32 based on the RF signals from the pickup 32. The CD-DA circuit 52 (reproducing unit) reads the PCM data stored in the PCM data area of the SDRAM 36 at the reproduction speed to output the data to the DAC 54. This causes the audio reproduced from the PCM data to be output from the speaker 34.

For example, when it is detected that the PCM data cannot normally be read, for example, due to vibrations, the CD-DA processing circuit 52 rereads the corresponding PCM data from the recording medium 30 and stores the reread PCM data into the PCM data area of the SDRAM 36. Since the PCM data are read from the recording medium 30 at double speed and stored into the PCM data area, the reproduced audio is prevented from being discontinued even if the PCM data must be reread. An anti-shock loop function is implemented.

When the MP3 control register 62 is set for information giving an instruction of ripping, the MP3 encoder 60 (encoding unit) encodes (compresses) the PCM data output from the CD-DA processing circuit 52 to generate MP3 data and store the generated MP3 data into the MP3 data area of the SDRAM 36. The MP3 data area also acts as a ring buffer as is the case with the PCM data area. The MP3 encoder 60 updates the information stored in the MP3 capacity register 64 and indicative of the remaining capacity of the MP3 data area as needed. The information indicative of the remaining capacity of the MP3 data area is, for example, a size of the remaining capacity of the MP3 data area, a usage rate of the MP3 data area, a write address of the MP3 data, etc.

The external transfer circuit 66 reads the MP3 data stored in the MP3 data area of the SDRAM 36 and outputs the data to the USB microcomputer 24 based on information such as the transfer start address and the number of transferred bytes of the MP3 data set in the transfer control register 68. The MP3 data output to the USB microcomputer 24 are transferred to the USB device 40 such as a portable player.

The digital data reproducing apparatus 10 performs the ripping while reading and reproducing the PCM data stored in the recording medium 30 at double speed and transfers the MP3 data generated by the ripping to the USB device 40 as above. When the transfer to the USB device 40 is temporarily interrupted or when the transfer speed to the USB device 40 is lower than the generation speed of the MP3 data, a size of the MP3 data stored in the MP3 data area of the SDRAM 36 is increased. Therefore, the system microcomputer 22 controls the readout of the PCM data from the recording medium 30 to prevent the overflow of the MP3 data from the MP3 data area of the SDRAM 36 based on information stored in the MP3 capacity register 64, etc.

Figure 3:
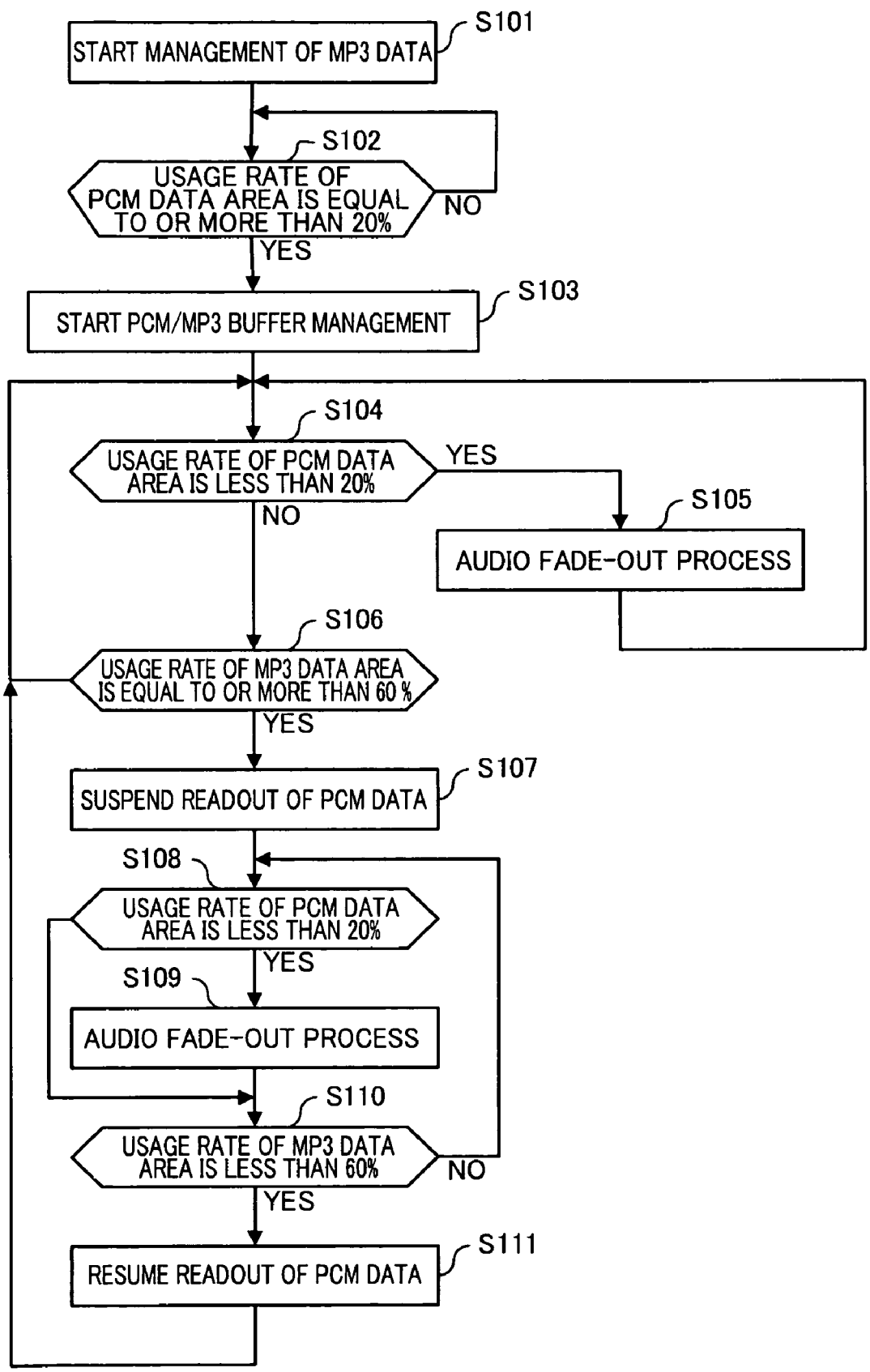
FIG. 3 is a flowchart of an example of control by a system microcomputer in the case of the ripping while reading PCM data at double speed.

FIG. 3 is a flowchart of an example of control by the system microcomputer 22 in the case of the ripping while reading PCM data at double speed. The system microcomputer 22 implements the process of FIG. 3 by executing a program stored in an internal or external memory.

When performing the ripping while reading the PCM data at double speed, the system microcomputer 22 starts management of the MP3 data generated by the ripping (S101). When starting the management of the MP3 data, the system microcomputer 22 refers to the PCM capacity register 58 to check whether the usage rate of the PCM data area is equal to or more than 20% (S102). When the usage rate of the PCM data area is less than 20% (S102: NO), the system microcomputer 22 repeatedly check the usage rate of the PCM data area until the usage rate of the PCM data area becomes equal to or more than 20% (S102). When the usage rate of the PCM data area is equal to or more than 20% (S102: YES), the system microcomputer 22 starts management of the buffering into the PCM data area and the MP3 data area (S103). Therefore, when the usage rate of the PCM data area is less than 20%, the management of the buffering is not started. This is because if the readout of the PCM data is stopped when the usage rate of the PCM data area is small, i.e., when an amount of the PCM data stored in the PCM data area is small, there is a possibility that the PCM data to be reproduced run out and the reproduced audio is discontinued.

When the management of the buffering is started, the system microcomputer 22 checks whether the usage rate of the PCM data area is less than 20% (S104). When the usage rate of the PCM data area is less than 20% (S104: YES), the reproduced audio may be discontinued and, therefore, the system microcomputer 22 writes information giving an instruction for fading out the audio into the PCM control register 56 to cause the CD-DA processing circuit 52 to execute the fade-out process (S105).

When the usage rate of the PCM data area is equal to or more than 20% (S104: NO), the system microcomputer 22 refers to the MP3 capacity register 64 to check whether the usage rate of the MP3 data area is equal to or more than 60% (S106). When the usage rate of the MP3 data area is less than 60% (S106: NO), the system microcomputer 22 determines that the MP3 data are transferred to the USB device 40 without delay and repeatedly checks the usage rates of the PCM data area and the MP3 data area (S104, S106).

When the usage rate of the MP3 data area is equal to or more than 60% (S106: YES), the system microcomputer 22 determines that the transfer of the MP3 data to the USB device 40 is delayed due to a temporary write error to the USB device 40, a difference between the generation speed of the MP3 data and a transfer speed to the USB device 40, etc., and writes information into the PCM control register 56 to give an instruction for suspending the readout of PCM data from the recording medium 30 (S107). This may cause the suspension of the readout of PCM data from the recording medium 30 to prevent the MP3 data from overflowing from the MP3 data area. Although the readout of the PCM data from the recording medium 30 is suspended, the reproduced audio is not immediately discontinued since the PCM data read at double speed are stored in the PCM area.

While the readout of the PCM data is suspended, the system microcomputer 22 checks whether the usage rate of the PCM data area is less than 20% (S108), and when the usage rate is less than 20% (S108: YES), the system microcomputer 22 writes information giving an instruction for fading out the audio into the PCM control register 56 to cause the CD-DA processing circuit 52 to execute the fade-out process (S109). The system microcomputer 22 remains in the suspended state while the usage rate of the MP3 data area is equal to or more than 60% (S110: NO). When the usage rate of the MP3 data area becomes less than 60% (S110: YES), the system microcomputer 22 writes information into the PCM control register 56 to give an instruction for resuming the readout of the PCM data from the recording medium 30 (S111). Thereby, reading the PCM data from the recording medium 30 is resumed, and storing respectively the PCM data and the MP3 data in the PCM data area and the MP3 data area is resumed. The procedure goes back to the process of checking the usage rate of the PCM data area (S104) to repeatedly execute the series of processes (S105 to S111).

The digital data reproducing apparatus 10 reads the PCM data from the recording medium 30 at double speed, and stores the read PCM data into the PCM data area and transfers the MP3 data generated by ripping the read PCM data to the USB device 40 as above. Therefore, even if the readout of the PCM data from the recording medium 30 is temporarily stopped due to a write error to the USB device 40, a difference between the generation speed of the MP3 data and a transfer speed to the USB device 40, etc., the immediate discontinuation of the reproduced audio may be prevented.

The digital data reproducing apparatus 10 temporarily stops the readout of the PCM data from the recording medium 30 when the usage rate of the MP3 data area becomes equal to or more than 60%. The readout of the PCM data from the recording medium 30 is stopped when the remaining capacity of the MP3 data area becomes smaller than a predetermined capacity, and the readout of the PCM data from the recording medium 30 is resumed when the remaining capacity of the MP3 data area becomes greater than a predetermined capacity. This may prevent the MP3 data from overflowing from the MP3 data area even if the MP3 data stored in the MP3 data area are increased due to a write error to the USB device 40, a difference between the generation speed of the MP3 data and a transfer speed to the USB device 40, etc. Since the PCM data are read at double speed from the recording medium 30 and stored in the PCM data area, the immediate discontinuation of the reproduced audio may be prevented when the readout of the PCM data is suspended.

The digital data reproducing apparatus 10 manages the buffering into the PCM data area and the MP3 data area when the usage rate of the PCM data area is equal to or more than 20%. When the data size of the PCM data stored in the PCM data area and not reproduced are greater than a predetermined size, the management of the buffering is performed. This causes the readout of the PCM data to be stopped when an amount of the PCM data stored in the PCM data area is small and the reproduced audio may be prevented from being discontinued.

The digital data reproducing apparatus 10 executes the fade-out process of audio when the usage rate of the PCM data are becomes less than 20% while the management of the buffering into the PCM data area and the MP3 data area is performed. When the data size of the PCM data stored in the PCM data area and not reproduced becomes smaller than a predetermined size, the reproduction level of the PCM data is reduced in a stepwise manner. This may prevent the abrupt discontinuation of the reproduced audio because the PCM data stored in the PCM data area run out due to the suspension of the readout of the PCM data from the recording medium 30.

Both the PCM data area and the MP3 data area managed in the digital data reproducing apparatus 10 are formed on the SDRAM 36. The SDRAM 36 necessary for implementing the anti-shock proof function may be used to manage the buffering of the MP3 data. Therefore, a separate memory is not necessary other than that necessary for implementing the anti-shock proof function and increased in costs may be constrained.

According to the embodiment, data obtained by ripping digital data may be transferred to an external memory without discontinuation of the reproduction of the digital data.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:
1. A digital data reproducing apparatus comprising:
a reading unit configured to read digital data stored in a recording medium at a speed higher than a reproduction speed to store the digital data into a first memory;
an encoding unit configured to store encoded data obtained by encoding the digital data read by the reading unit into a second memory;
a reproducing unit configured to reproduce the digital data stored in the first memory at the reproduction speed;
a transferring unit configured to transfer the encoded data stored in the second memory into a third memory different from the second memory, and
a control unit configured to control the reading unit so as to stop a readout of the digital data, when a remaining capacity of the second memory becomes smaller than a predetermined capacity, and so as to resume a readout of the digital data, when the remaining capacity becomes larger than or equal to the predetermined capacity, wherein
the control unit controls the reproducing unit so as to reduce a reproduction level of the digital data in a stepwise manner, when a data size of the digital data stored in the first memory and not reproduced becomes less than a first predetermined size.
2. The digital data reproducing apparatus of claim 1, wherein
the control unit controls the reading unit so as to stop and resume a readout of the digital data, when a data size of the digital data stored in the first memory and not reproduced is greater than or equal to a second predetermined size.

3. The digital data reproducing apparatus of claim 1, wherein
the first and second memories are constituted by two storage areas formed on one memory.

4. A recording medium having stored thereon a program for causing a computer configured to control a reproducing apparatus configured to read digital data stored in the recording medium and reproduce the digital data to execute the steps of:
controlling the reproducing apparatus so as to read the digital data at a speed higher than a reproduction speed to store the digital data into a first memory;
controlling the reproducing apparatus so as to store encoded data obtained by encoding the read digital data into a second memory;
controlling the reproducing apparatus so as to reproduce the digital data stored in the first memory at the reproduction speed;
controlling the reproducing apparatus so as to transfer the encoded data stored in the second memory into a third memory different from the second memory;
controlling the reproducing apparatus so as to stop a readout of the digital data, when a remaining capacity of the second memory becomes smaller than a predetermined capacity, and so as to resume a readout of the digital data, when the remaining capacity becomes larger than or equal to the predetermined capacity; and
controlling the reproducing apparatus so as to reduce a reproduction level of the digital data in a stepwise manner, when a data size of the digital data stored in the first memory and not reproduced becomes less than a first predetermined size.

5. The recording medium of claim 4, wherein
the step of controlling the reproducing apparatus so as to stop and resume a readout of the digital data includes controlling the reproducing apparatus so as to stop and resume a readout of the digital data when a data size of the digital data stored in the first memory and not reproduced is greater than or equal to a second predetermined size.

* * * * *